No. 822,941. PATENTED JUNE 12, 1906.
C. G. GLASRUD.
MECHANICAL MOVEMENT.
APPLICATION FILED MAR. 21, 1905.
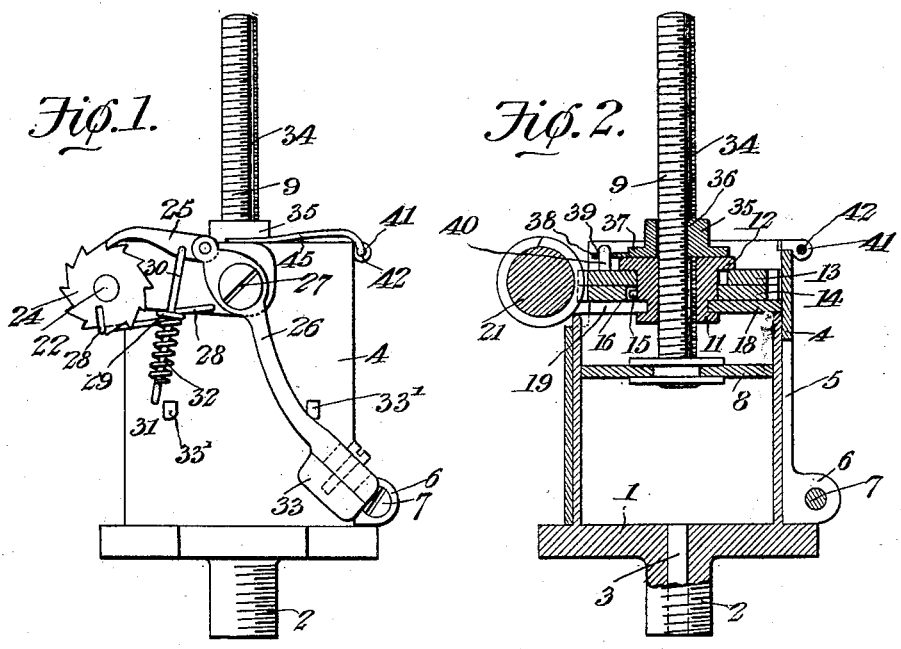
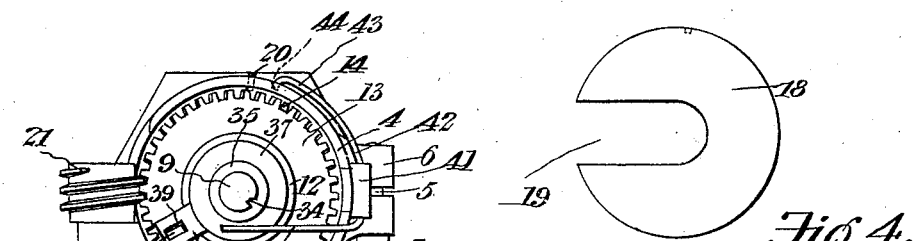
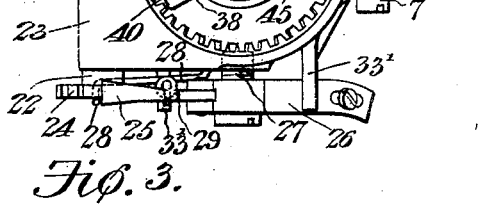
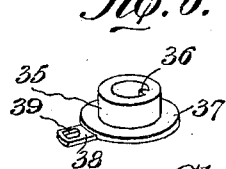
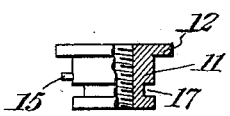
Witnesses
Christian G. Glasrud Inventor
by C A Snow & Co
Attorneys

UNITED STATES PATENT OFFICE.

CHRISTIAN G. GLASRUD, OF SHEYENNE, NORTH DAKOTA.

MECHANICAL MOVEMENT.

No. 822,941.      Specification of Letters Patent.      Patented June 12, 1906.

Application filed March 21, 1905. Serial No. 251,270.

*To all whom it may concern:*

Be it known that I, CHRISTIAN G. GLASRUD, a citizen of the United States, residing at Sheyenne, in the county of Eddy and State of North Dakota, have invented a new and useful Mechanical Movement, of which the following is a specification.

This invention relates to mechanical movements for various purposes, and I have elected to show the said invention in its application to one of that class of lubricators which are used for supplying viscous or semifluid lubricating material to crank-pins and other bearings, and it may be described as an improvement upon the mechanical movement of the lubricator for which application for Letters Patent of the United States, Serial No. 205,819, was filed by myself on the 30th day of April, 1904.

The object of the present invention is to present a device of the class referred to which shall possess superior advantages in point of simplicity, durability, ease and certainty of operation, and general efficiency; and with these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

In said drawings, Figure 1 is a side view of a lubricator equipped with a mechanical movement constructed in accordance with the principles of the invention. Fig. 2 is a vertical sectional view of the same. Fig. 3 is a top plan view. Fig. 4 is a detail plan view of the hub-supporting disk. Fig. 5 is a detail elevation, partly in section, of the hub. Fig. 6 is a perspective detail view of the collar engaging and operating the feed-screw.

Corresponding parts in the several figures are indicated throughout by similar characters of reference.

The lubricant container or cup 1 is provided with a threaded stem 2, whereby it may be attached to the crank or other member to be lubricated, an aperture 3 being provided for the escape of the lubricating material. Fitted over the cup 1 is a cap 4, having a slit 5, adjacent to which are formed ears 6, one of which is threaded for the reception of a clamping-bolt 7, whereby the cap may be mounted securely upon the cup, but in such a manner as to permit it to be readily detached for the purpose of supplying lubricating material to the cup.

Fitted for movement within the cup 1 is a piston 8, which is swiveled upon the lower end of a screw-threaded stem 9, which constitutes the feed-screw. The latter extends through a hub 11, which is interiorly threaded for the passage of said feed-screw. The hub 11 is provided at its upper edge with a flange 12 for the purpose of retaining in position a pair of peripherally-toothed disks or gears 13 and 14, the upper one of which, 13, is free to rotate loosely upon the hub, while the lower disk 14 is connected for rotation with the hub by means of a pin 15, extending radially from the latter and engaging a notch 16 in the eye of said disk. The hub is provided near its lower edge with an annular groove 17 for the reception of a seat-plate or supporting-plate 18, having a notch or recess 19 for engagement with the groove 17. The plate 18 is seated upon the upper edge of the cup 1 within the cap 4, where it is secured by means of a set-screw 20.

The gear-disks 13 and 14 have an unequal number of cogs or teeth, one of said disks being preferably provided with one more cog than the other disk, and both of said disks are in mesh with a worm 21 upon a shaft 22, journaled in a bearing 23 at the upper end of the cap 4, said shaft carrying also a ratchet-wheel 24, engaged by a pawl 25, which is pivotally connected with a pendulum 26, the latter being supported for vibration upon a stem 27, having threaded connection with the upper end of the cap or casing and preferably extending through the latter so as to bear against the supporting-disk 18 at a point opposite to the set-screw 20, thereby assisting the latter in retaining the supporting-disk securely in position. Pivotally connected with the cap or casing is a pawl member 28, which engages the ratchet-wheel 24 to prevent reverse movement of the latter. Said holding-pawl or check-pawl has an eye 29, through which extends a pin 30, connected pivotally with the pawl 25 and provided at its lower end with a head 31, between which and the eye 29 is disposed a coiled spring 32, the tension of which serves to force the check-pawl 28 upward and the pawl 25 downward in engagement with opposite sides of the ratchet-wheel 24, which latter may thus be operated by the pawl 25 and retained by the check-pawl 28, as will be readily understood. The pendulum 26 is preferably provided with an adjustable weight 33, enabling the said pendulum to be nicely adjusted for accurate operation, according to the speed and power of the machinery with which the lubricator is connected for operation.

In Fig. 1 of the drawings the cap or casing 4 has been shown as provided with lugs or projections 33' for the purpose of limiting the movement of the pendulum; but these stops may be omitted when desired, and the construction and the character of the pendulum may also be changed and modified within the scope of the invention.
The feed-screw 9 of the device is provided with a longitudinal groove 34, which may be either straight or spiral, a straight groove having been shown in the drawings. A collar 35, which loosely engages the feed-screw, is provided with a tooth 36, engaging the groove 34. Said collar is also provided at its lower edge with a flange 37 and with a radially-extending arm 38, having a notch or slot 39, engaging a projection 40 upon the upper face of the upper disk 13. The cap 4 has a perforated lug 41, in which is fitted a spring 42, having one arm 43, that engages a recess 44 in the side of the casing and another free arm 45, that rests upon the flange 37 of the collar 35, the function of this torsion-spring being to retain the collar 35 in its proper position during the operation of the device.

When the pendulum 26 vibrates, owing to the motion of the machinery with which the lubricator is operatively connected, the worm-carrying shaft 22 is intermittently rotated by the pawl 25, engaging the ratchet-wheel 24. As the worm-shaft rotates the gear-disks 13 and 14 are likewise rotated, but at differential speed, owing to the difference in the number of cogs upon said disks. The upper disk 13 transmits motion to the feed-screw, which is thereby rotated and fed forward in the hub 11; but the latter is at the same time rotated by the disk 14, so that the progressive feed movement of the screw will be very slow. Regulation of said feed movement may be effected by providing ratchet-wheels 24 with various numbers of teeth by varying the number of teeth upon the gear-disks 13 14, and in numerous other ways, which will readily suggest themselves.

This improved device is simple, inexpensive, easily applied, and efficient in operation, and the movement of the piston-carrying feed-screw, whereby the lubricating material is forced to the bearing that is to be lubricated, while absolutely steady, may be made so slow as to positively prevent overfeed and waste of lubricating material.

Having thus described the invention, what is claimed is—

1. A hub supported for rotation and having a threaded aperture, a piston-carrying feed-screw extending through the latter, a pair of gear-disks engaging the hub and having different numbers of teeth, one of said gear-disks being connected for rotation with the hub and the other with the feed-screw, a worm meshing with said gears, and means for operating said worm.

2. A piston having a swiveled feed-screw, a hub engaging said feed-screw and having a flange at its upper edge and an annular groove near its lower edge, a slotted supporting-plate engaging the groove in the hub and supporting the latter for rotation, a pair of gear-disks having different numbers of teeth mounted upon the hub between the supporting-plate and the flange at the upper edge of the hub, one of said disks being connected for rotation with the hub, a collar having slidable connection with the feed-screw, and means whereby said collar is connected for rotation with the other gear-disk.

3. A supporting-plate, a hub having rotary engagement with said plate, a piston-carrying feed-screw having threaded engagement with the hub, gear-disks mounted upon the hub and having unequal numbers of teeth, one of said gear-disks being connected for rotation with the hub and the other with the feed-screw, a shaft supported for rotation and having a worm engaging the gear-disks, a ratchet-wheel upon the worm-carrying shaft, and a pendulum carrying a pawl engaging said ratchet-wheel.

4. A piston, a screw-threaded stem swiveled in said piston, a hub engaging said screw-threaded stem and having an annular flange at its upper edge and an annular groove near its lower edge, a notched supporting-plate engaging said groove, a collar loosely engaging the feed-screw and having a tooth engaging a longitudinal groove in the latter, said collar resting loosely upon the hub, a pair of gear-disks engaging said hub between the flange and the supporting-plate, said disks having unequal numbers of teeth, means connecting said gear-disks for rotation, respectively, with the hub and with the feed-screw, a torsion-spring engaging the collar upon the feed-screw to retain said collar in position for operation, and a suitably supported and operated worm engaging the gear-disks.

In testimony that I claim the foregoing as my own I have hereto affixed my signature in the presence of two witnesses.

CHRISTIAN G. GLASRUD.

Witnesses:
M. H. OLIVER,
O. B. STEDMAN.